United States Patent
Kim et al.

(10) Patent No.: US 11,524,264 B2
(45) Date of Patent: Dec. 13, 2022

(54) AERATOR DEVICE AND FILTER SYSTEM INCLUDING THE SAME

(71) Applicant: SAMSUNG SDI CO., LTD., Yongin-si (KR)

(72) Inventors: Ji Hye Kim, Uiwang-si (KR); Fufang Zha, Uiwang-si (KR); Young Lim Koo, Uiwang-si (KR); Gyu Hong Min, Uiwang-si (KR); Hyoung Wook Ahn, Uiwang-si (KR); Byung Kook Hwang, Uiwang-si (KR)

(73) Assignees: LOTTE CHEMICAL CORPORATION, Seoul (KR); LOTTE ADVANCED MATERIALS CO., LTD., Yeosu-si (KR)

( * ) Notice: Subject to any disclaimer, the term of this patent is extended or adjusted under 35 U.S.C. 154(b) by 483 days.

(21) Appl. No.: 14/587,658

(22) Filed: Dec. 31, 2014

(65) Prior Publication Data
US 2015/0182919 A1 Jul. 2, 2015

(30) Foreign Application Priority Data
Dec. 31, 2013 (KR) .................. 10-2013-0168826

(51) Int. Cl.
*B01D 65/02* (2006.01)
*B01D 63/02* (2006.01)
(Continued)

(52) U.S. Cl.
CPC ............ *B01D 65/02* (2013.01); *B01D 61/18* (2013.01); *B01D 61/20* (2013.01); *B01D 63/02* (2013.01);
(Continued)

(58) Field of Classification Search
CPC ........ B01D 61/08; B01D 61/18; B01D 63/02; B01D 65/02; B01D 65/08;
(Continued)

(56) References Cited

U.S. PATENT DOCUMENTS

| 3,904,524 A | 9/1975 | Pelton et al. |
| 5,783,083 A | 7/1998 | Henshaw et al. |

(Continued)

FOREIGN PATENT DOCUMENTS

| CN | 1431927 A | 7/2003 |
| CN | 2675219 Y | 2/2005 |

(Continued)

OTHER PUBLICATIONS

Examiner, Area Calculation Sheet, 2016, 1 page.*
(Continued)

*Primary Examiner* — Jonathan M Peo
(74) *Attorney, Agent, or Firm* — Lewis Roca Rothgerber Christie LLP

(57) ABSTRACT

An aerator device and a filter system including the same are provided. The aerator device includes: a housing having an inner cavity defined therein, the housing including at least one sidewall and an upper surface connected to the at least one sidewall; a first partition formed within the inner cavity and extending from an upper end to a lower end to define a first cavity and a second cavity; and a second partition formed within the inner cavity between the first partition and a first sidewall of the at least one sidewall and extending from an upper end to a lower end to define a first chamber and a second chamber of the second cavity, and the housing includes an inlet opening communicating with the first cavity and an outlet opening communicating with the second chamber, and the second chamber gradually narrows towards the upper surface of the housing.

8 Claims, 17 Drawing Sheets

(51) Int. Cl.
  *B01D 61/18* (2006.01)
  *B01D 65/08* (2006.01)
  *B01D 61/20* (2006.01)
  *B01F 23/231* (2022.01)
  *B01F 35/71* (2022.01)

(52) U.S. Cl.
  CPC ........ *B01D 65/08* (2013.01); *B01F 23/23121* (2022.01); *B01F 35/71755* (2022.01); *B01F 35/71801* (2022.01); *B01D 2313/26* (2013.01); *B01D 2315/06* (2013.01); *B01D 2319/00* (2013.01); *B01D 2321/185* (2013.01)

(58) Field of Classification Search
  CPC .......... B01D 2201/087; B01D 2221/12; B01D 2313/26; B01D 2315/06; B01D 2315/30; B01D 2319/00; B01D 2321/185; B01F 3/04113; B01F 3/04248; B01F 13/0233; B01F 13/0238; B01F 13/025; B01F 13/0255; B01F 15/024; B01F 15/0259; B01F 2003/04127; B01F 2003/04134; B01F 2003/04141; B01F 2003/04304; B01F 2003/04368; C02F 2/223
  See application file for complete search history.

(56) References Cited

U.S. PATENT DOCUMENTS

| | | | | |
|---|---|---|---|---|
| 5,863,472 | A * | 1/1999 | Jones | B01F 3/04113 261/121.1 |
| 6,162,020 | A | 12/2000 | Kondo | |
| 6,284,135 | B1 * | 9/2001 | Ookata | B01D 61/18 210/220 |
| 6,638,424 | B2 * | 10/2003 | Stever | B01D 17/00 210/170.03 |
| 6,706,189 | B2 * | 3/2004 | Rabie | B01D 61/18 210/321.79 |
| 7,122,121 | B1 | 10/2006 | Ji | |
| 7,445,709 | B2 | 11/2008 | Beaule et al. | |
| 8,038,882 | B2 | 10/2011 | Hashimoto | |
| 10,828,607 | B2 * | 11/2020 | Min | B01D 63/043 |
| 2008/0017558 | A1 * | 1/2008 | Pollock | B01D 61/18 210/90 |
| 2009/0283465 | A1 | 11/2009 | Nakayama | |
| 2010/0218789 | A1 | 9/2010 | Baba et al. | |
| 2011/0049047 | A1 * | 3/2011 | Cumin | B01D 65/00 210/636 |
| 2011/0100907 | A1 * | 5/2011 | Zha | B01D 63/024 210/615 |
| 2011/0198283 | A1 | 8/2011 | Zha et al. | |
| 2012/0091602 | A1 * | 4/2012 | Cumin | B01D 61/18 261/122.1 |
| 2014/0076806 | A1 | 3/2014 | Min et al. | |
| 2014/0238922 | A1 * | 8/2014 | Puglia | B01D 29/07 210/236 |
| 2015/0290563 | A1 * | 10/2015 | Boyle | B01D 61/20 210/798 |

FOREIGN PATENT DOCUMENTS

| | | | | |
|---|---|---|---|---|
| CN | 2793623 | Y | 7/2006 | |
| CN | 101448562 | A | 6/2009 | |
| CN | 101790411 | A | 7/2010 | |
| CN | 202156951 | U | 3/2012 | |
| CN | 202606043 | U | 12/2012 | |
| CN | 203155105 | U | 8/2013 | |
| EP | 1 652 572 | A1 | 5/2006 | |
| JP | 2003340250 | A * | 12/2003 | ............. B01D 65/02 |
| JP | 2004322100 | A * | 11/2004 | ............. B01D 65/02 |
| WO | WO 2008/132186 | A1 | 11/2008 | |
| WO | WO 2008/153818 | A1 | 12/2008 | |
| WO | WO2014052139 | A1 * | 4/2014 | ............. B01D 61/20 |

OTHER PUBLICATIONS

U.S. Appl. No. 14/587,658, Portion of Office Action dated Sep. 2, 2016, 10 pages.*
Non-final Office action from related U.S. Appl. No. 13/835,153, filed Mar. 15, 2013. Office action dated Aug. 1, 2014 (15 pgs.).
Final Office action from related U.S. Appl. No. 13/835,153, filed Mar. 15, 2013. Office action dated Dec. 18, 2014 (14 pgs.).
Advisory action from related U.S. Appl. No. 13/835,153, filed Mar. 15, 2013. Advisory action dated Mar. 11, 2015 (3 pgs.).
Non-final Office action from related U.S. Appl. No. 13/835,153, filed Mar. 15, 2013. Office action dated Jun. 8, 2015 (18 pgs.).
Final Office action from related U.S. Appl. No. 13/835,153, filed Mar. 15, 2013. Office action dated Nov. 4, 2015 (21 pgs.).
China Office action dated Oct. 10, 2015 in related Chinese Patent Application No. 2013800415111 (5 pgs).
European Search Report in corresponding European Application No. 14200528.9, European Search Report dated Jul. 13, 2015 (6 pgs.).
China Office action in corresponding Chinese Application No. 201410852661.7, Office action dated May 5, 2016 (6 pgs.).
Final Office action dated Jul. 14, 2016 in related U.S. Appl. No. 13/835,153, filed Mar. 15, 2013, Inventor Gyu Hong Min (26 pgs.).
Extended European Search Report dated Mar. 3, 2016 and dated Mar. 10, 2016 in related European Application No. 13828252.0-1703 (8 pgs.).
Non-final Office action dated Mar. 22, 2016 in related U.S. Appl. No. 13/835,153, filed Mar. 15, 2013, inventor Gyu Hong Min (27 pgs.).
Extended European Search Report dated Mar. 3, 2016 and dated Mar. 10, 2016 in related European Application No. 13828262.0-1703 (8 pgs.).
Non-final Office Action from related U.S. Appl. No. 13/835,153, non-final Office action dated May 31, 2018 (21 pages total).
Office Action dated Nov. 26, 2019 in related U.S. Appl. No. 13/835,153, filed Mar. 15, 2013, Inventor Gyu Hong Min (35 pages total).

* cited by examiner

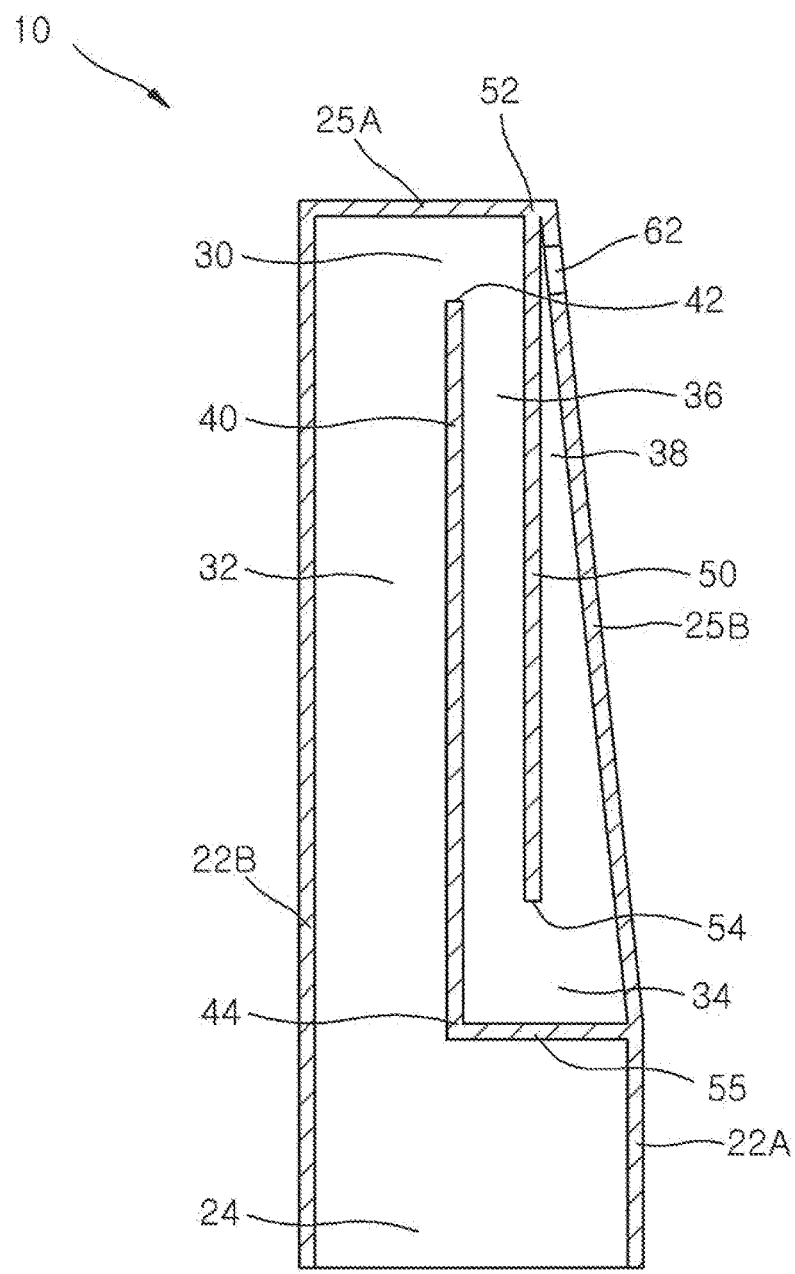

A1 < A2

AERATOR DEVICE AND FILTER SYSTEM INCLUDING THE SAME

CROSS-REFERENCE TO RELATED APPLICATION

This application claims priority to and, the benefit of Korean Patent Application No. 10-2013-0168826, filed on Dec. 31, 2013 in the Korean Intellectual Property Office, the entire content of which is incorporated herein by reference.

BACKGROUND

1. Field

Aspects of embodiments of the present invention relate to an aerator device and a filter system including the same.

2. Description of Related Art

A water purification filter submerged in water may be comprised of a membrane module or cassette including at least one bundle of hollow fiber membranes. Water may be pumped through the fiber membranes for filtering the water in applications such as desalinization, water treatment, sewage treatment, water reuse, and the like. The hollow fiber membrane includes pores having various sizes depending upon a purpose of filtration such that the filter can filter out contaminants having a greater size than the size of the pores from water introduced into the hollow fiber membrane. Such filtration may be classified as, for example, nanofiltration, ultrafiltration or microfiltration, and the pores typically have a size of 0.001 µm to 10 µm. In a submerged filter, the filter membranes may be aerated with bubbles in order to clean the filter membranes.

Various attempts have been made to provide an aerator for cleaning the membrane filter.

U.S. Patent Publication No. 2011/0198283 and WO 2008/153818 disclose an aerator which is attached to a lower end of a membrane module, wherein a binary-phase fluid flow is supplied into fiber bundles in the module in order to clean membranes.

U.S. Patent Publication No. 2011/0049047 discloses an aerator which includes a conduit from which bubbles are generated and introduced into fiber bundles in a filter module.

U.S. Pat. No. 8,038,882 discloses an aerator that has a pipe structure for generating bubbles to be introduced into a filter module. Like the above publications, this reference discloses a one-piece structure of the aerator and the filter module.

However, in the aforementioned references, an air supply unit is configured to reduce a rate of gas movement by blocking a chamber before the gas spreads into the membrane filter, thereby causing deposition of sludge in the chamber. In addition, the air supply unit is integrated into the filter module and, thus, is not well compatible with other types of filter modules having different shapes. Moreover, the air supply unit has a pipe-shaped inner structure, thereby resulting in low productivity.

To address such problems in the related art, the inventors of the present invention developed an aerator device including a plurality of chambers. However, in this aerator device, air bubbles can remain in the chambers. Therefore, there is a need for an aerator device configured to completely release collected air.

SUMMARY

According to an aspect of embodiments of the present invention, an aerator device includes a chamber partitioned into an air storage compartment, an air retention compartment, and an air bubble flow compartment. Air entering the device is held for a certain period of time and then released within a short period of time through an outlet opening formed at an upper portion of a partition. According to embodiments of the present invention, the released air provides a high air scouring effect for cleaning a filter, such as a membrane filter, with low air consumption.

According to one or more embodiments of the present invention, an aerator device includes: a housing having an inner cavity defined therein, the housing including at least one sidewall and an upper surface connected to the at least one sidewall: a first partition formed within the inner cavity and extending from an upper end to a lower end to define a first cavity and a second cavity; and a second partition formed within the inner cavity between the first partition and a first sidewall of the at least one sidewall and extending from an upper end to a lower end to define a first chamber and a second chamber of the second cavity, and the housing includes an inlet opening communicating with the first cavity and an outlet opening communicating with the second chamber, the first partition is spaced apart at the upper end thereof from the upper surface of the housing to form a first opening, through which the first cavity and the second cavity are in communication with each other, the upper end of the second partition is connected to the upper surface of the housing, the first chamber and the second chamber being in communication with each other below the lower end of the second partition, and the second chamber gradually narrows towards the upper surface of the housing.

In one embodiment, the outlet opening may be in communication with the second chamber through the upper surface of the housing.

In one embodiment, the outlet opening may be formed at an upper portion of the first sidewall.

The first and the second partitions may include a flat surface, a curved surface, or a polygonal surface.

The at least one sidewall may include a pair of first opposite sidewalls and a pair of second opposite sidewalls connected to the first opposite sidewalls, the pair of first opposite sidewalls including the first sidewall, the first and the second partitions extending from one of the second opposite sidewalls to the other of the second opposite sidewalls.

The outlet opening may include a slot extending parallel to the second partition in a width direction.

The aerator device may further include a third partition connecting the lower end of the first partition to the first sidewall, the third partition being spaced apart from the lower end of the second partition to form a second opening through which the first chamber and the second chamber are in communication with each other.

The aerator device may be configured to intermittently release gas bubbles from the outlet opening when the aerator device is submerged in a liquid medium and a gas is supplied to the first cavity through the inlet opening.

In one embodiment, the second chamber is defined by the second partition and the first sidewall facing each other, and a pair of second opposite sub-sidewalls connecting the second partition and the first sidewall, and the second partition may be parallel to the first sidewall, and the second opposite sub-sidewalls may be inclined relative to each other such that a distance between the second opposite sub-sidewalls gradually decreases towards the upper surface of the housing.

In one embodiment, the second chamber is defined by the second partition and the first sidewall facing each other, and a pair of second opposite sub-sidewalls connecting the second partition and the first sidewall, and the second opposite sub-sidewalls may be parallel to each other, and the second partition and the fir sidewall may be inclined relative to each other such that a distance between the second partition and the first sidewall gradually decreases towards the upper surface of the housing.

In one embodiment the second chamber is defined by the second partition and the first sidewall facing each other, and a pair of second opposite sub-sidewalls connecting the second partition and the first sidewall, and an upper area A1 defined by the upper end of the second partition, the first sidewall, and the pair of second opposite sub-sidewalls is smaller than a lower area A2 defined by the lower end of the second partition, the first sidewall, and the pair of second opposite sub-sidewalls.

A ratio of the upper area A1 to the lower area A2 may be about 1:1.5 to about 1:10.

According to another aspect of the present invention, a filter system includes: a filter; and the aerator device described above, the aerator device being arranged below the filter. The filter and the aerator device are configured to be submerged in a liquid medium.

The filter may include a fiber membrane filter, and the filter system may further include a pump to flow the liquid medium through the fiber membrane filter.

The filter may include a plurality of filter modules, and the aerator device may include a plurality of aerator units. A respective aerator unit of the plurality of aerator units may be arranged below each filter module of the plurality of filter modules.

According to an aspect of embodiments of the present invention, an aerator device is configured to allow collected air to be completely released without air bubbles remaining in a chamber.

According to another aspect of embodiments of the present invention, an aerator device is configured such that erupted gas bubbles are directly and efficiently used to scour a filter, such as a membrane filter, in order to reduce redistribution of the gas bubbles and to utilize the initial energy of the gas bubbles, thereby securing high efficiency and low energy consumption.

According to another aspect of embodiments of the present invention, an aerator device can provide a strong scouring effect through strong pulsating operation without air remaining in the aerator device.

According to another aspect of embodiments of the present invention, an aerator device can achieve high cleaning efficiency with low energy consumption by converting a continuous as supply into intermittent gas bubbles.

According to another aspect of embodiments of the present invention, an aerator device can provide effective aeration from an air supply unit while reducing an amount of air used and a cost of operation.

According to another aspect of embodiments of the present invention, an aerator device is capable of operating stably for a long period of time by reducing accumulation of sludge.

According to another aspect of embodiments of the present invention, an aerator device can be combined and/or expanded in series or parallel to correspond to and efficiently aerate any of various configurations of a filter.

According to another aspect of embodiments of the present invention an aerator device has a simple structure to improve productivity while reducing manufacturing costs.

According to another aspect of embodiments of the present invention, a filter system includes the aerator device as set forth above.

According to aspects of embodiments of the present invention, the aerator device allows collected air to be completely released without air bubbles remaining in a chamber, and allows erupted gas bubbles to be directly and efficiently used to scour a filter, such as a membrane filter, in order to reduce redistribution of the gas bubbles and to utilize initial energy of the gas bubbles, thereby securing high efficiency and low energy consumption. In addition, the aerator device can provide a strong scouring effect through strong pulsating operation without air remaining in the aerator device, can achieve high cleaning efficiency with low energy consumption by converting a continuous gas supply into intermittent gas bubbles, and can provide effective aeration from an air supply unit while reducing an amount of air used and a cost of operation. Further, the aerator device is capable of operating stably for a long period of time by reducing accumulation of sludge, can be combined and/or expanded in series or parallel to correspond to and efficiently aerate any of various configurations of a filter and has a simple structure to improve productivity while reducing manufacturing costs. Furthermore, according to another aspect of embodiments of the present invention, a filter system includes the aerator device as set forth above.

BRIEF DESCRIPTION OF THE DRAWINGS

FIG. 2E illustrates a sectional view of the aerator device in accordance with another embodiment of the present invention.

DETAILED DESCRIPTION

Figure 1:
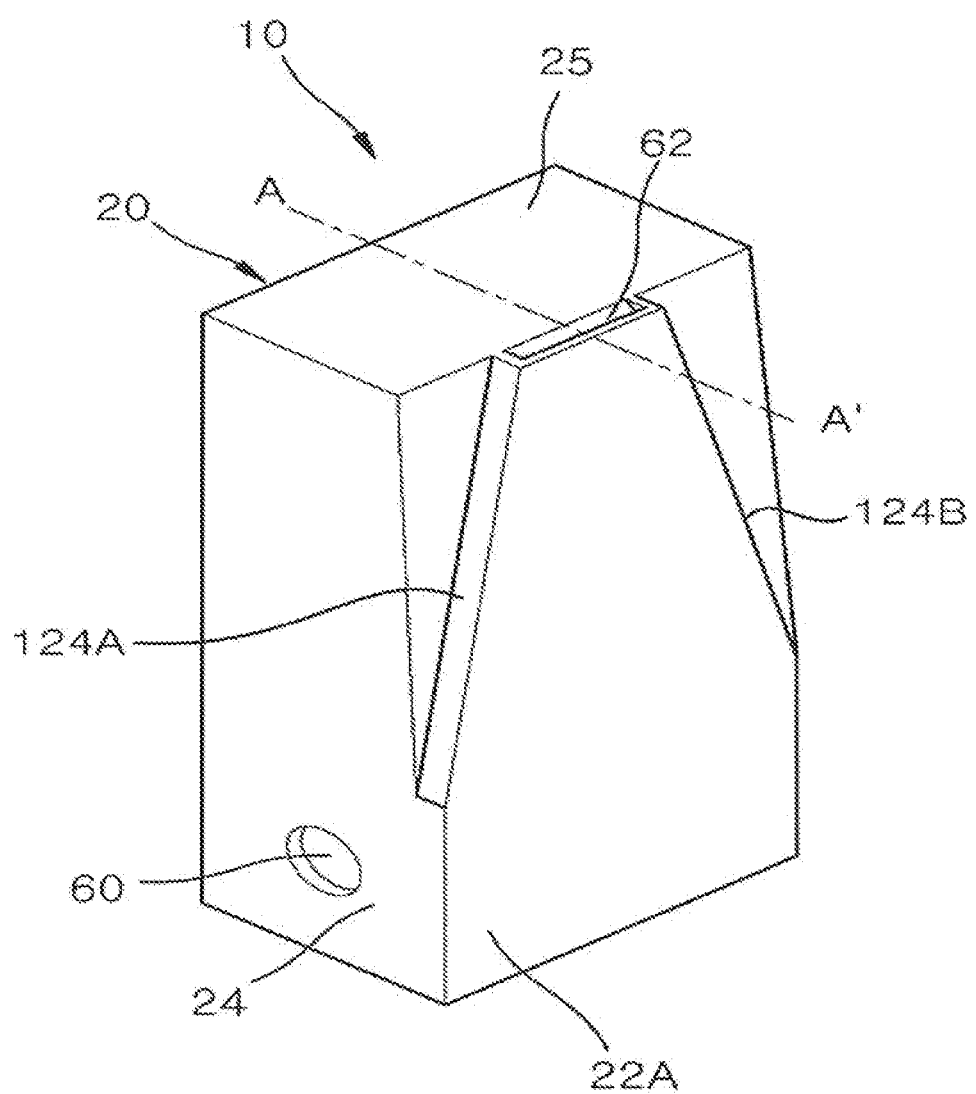
FIG. 1 illustrates a perspective view of an aerator device in accordance with an embodiment of the present invention.

Some exemplary embodiments of the present invention are described hereinafter in further detail with reference to the accompanying drawings. It should be understood that embodiments of the present invention may be embodied in different ways by those skilled in the art without departing from the spirit or scope of the invention. The following exemplary embodiments are described by way of illustration in order to provide a thorough understanding of the present invention to those skilled in the art, and are not intended to be interpreted as limiting the scope of the present invention.

It should be noted that the drawings are not to precise scale and some of the dimensions, such as width, length, thickness, and the like, may be exaggerated for clarity of description in the drawings. In addition, it will be understood that, when an element is referred to as being "on" or "under" another element, the element can be directly formed on or under the other element, or an intervening element or intervening elements may also be present therebetween. Further, expressions indicating spatial orientations, such as "upper (portion)" and lower (portion) are to be construed as indicating relative orientations instead of absolute orientations. Furthermore, it should be understood that descriptions of functions or features of a certain embodiment may also be applied to similar functions or features of other embodiments.

Figure 2A:
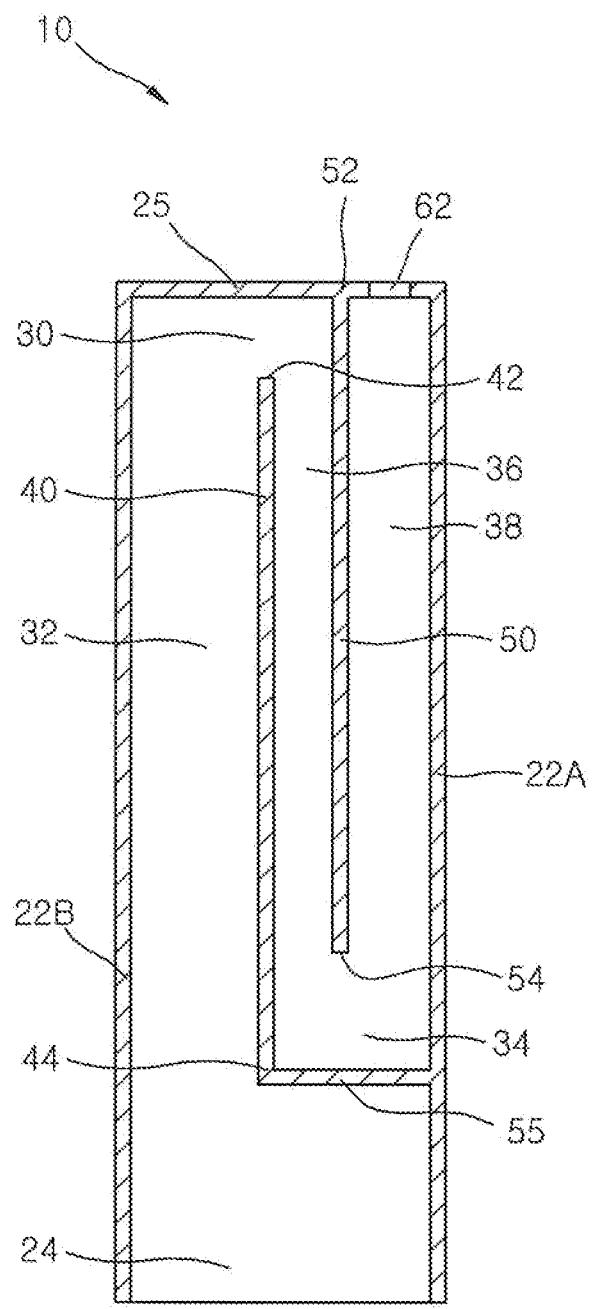
FIG. 2A illustrates a sectional view taken along the line A-A' of FIG. 1.

Referring to FIGS. 1 and 2A, an aerator device 18 according to an embodiment of the present invention includes: a housing 20, which includes a pair of first opposite sidewalls 22A, 22B a pair of second opposite sidewalls 24 connected to the first opposite sidewalls 22A, 22B, and an upper surface 25 connected to the first opposite sidewalls 22A, 22B and the second opposite sidewalls 24, wherein an inner cavity 30 is defined in the housing 20 by the first opposite sidewalls 22A, 22B, the second opposite sidewalls 24 and the upper surface 25. In this embodiment, the upper surface 25 is placed at an upper portion of the housing 20 and is perpendicular to the first opposite sidewalls 22A, 22B and the second opposite sidewalls 24. The upper surface 25 connects at least one sidewall to the upper portion of the housing and may constitute a cover or a ceiling of the housing 20. Although the upper surface 25 is illustrated as having a flat shape in the drawings, it should be understood that embodiments of the present invention are not limited thereto. Alternatively, the upper surface 25 may have various shapes such as a curved surface, a polygonal surface, and the like. In addition, the upper surface may form a stepped portion. For example, referring to FIG. 2C, a first cavity 32 and a first chamber 36 have an upper surface 25A formed in a first plane, and a second chamber 38 has an upper surface 256 formed in a second plane, which may be different from the first plane. For example, the first plane and the second plane may be perpendicular to a side surface, or may be inclined at a certain angle with respect to each other. For example, the first plane and the second plane may be inclined at an angle of about 100° to about 170°.

In another embodiment, the upper surface may form an inclined surface instead of the stepped portion. For example, the first opposite sidewall 22B may have a greater height than the first opposite sidewall 22A such that the upper surface extending from the first opposite sidewall 226 to the first opposite sidewall 22A has an inclination. Alternatively, the upper surface 25A connecting the first cavity 32 and the first chamber 36 may be parallel to a bottom surface of the housing, and the upper surface 256 of the second chamber 38 may have an inclination, as shown in FIG. 2D.

In another embodiment, as shown in FIG. 2E, the upper surface 25B may be connected between an upper end 52 of a second partition 50 and the first opposite sidewall 22A such that the upper surface 25B forms an inclined surface without forming a bent portion.

In one embodiment, the first opposite sidewalls 22A, 22B may be parallel to each other, and the second opposite sidewalls 24 may be parallel to each other and perpendicular to the first opposite sidewalls 22A, 22B. The housing 20 may have a hexahedral shape, but alternatively may have a cylindrical shape, or the like. The housing 20 may be formed of metal, plastic, glass fiber, ceramic, and/or other suitable materials.

In another embodiment, at least one pair of the pair of first opposite sidewalls 22A, 22B and the pair of second opposite sidewalls 24 may be formed to be inclined to each other.

The aerator device 10 includes a first partition 40 extending from a lower end 44 to an upper end 42 inside the inner cavity 30. The first partition 40 is arranged between the first opposite sidewalls 22A, 226 and defines the first cavity 32 and a second cavity 34 inside the inner cavity 30. The upper end 42 of the first partition 40 is separated from the upper surface 25 to form a first opening, through which the first cavity 32 communicates with the second cavity 34.

The aerator device 10 further includes a second partition 50 extending from the upper end 52 to a lower end 54 inside the inner cavity 30. The second partition 501 arranged between the first partition 40 and the first sidewall 22A, and defines the first chamber 36 and the second chamber 38 inside the second cavity 34.

The upper end 52 of the second partition 50 is connected to the upper surface 25, and the first chamber 36 and the second chamber 38 are in communication with each other below the lower end 54 of the second partition 50.

The second chamber 38 is gradually narrowed towards the upper surface 25. As such, the structure of the second chamber 38, an upper portion of which is narrower than a lower portion thereof, allows collected air to be completely released without remaining in the chamber.

In one embodiment, as shown in FIGS. 1 and 2A, the second chamber 38 includes the second partition 50 and the first sidewall 22A facing each other; and a pair of opposite sub-sidewalls 124A, 124B connecting the second partition 50 and the first sidewall 22A, wherein the second partition 50 and the first sidewall 22A are parallel to each other, and the opposite sub-sidewalls 124A, 124B are inclined such that a distance between the opposite sub-sidewalls 124A, 124B is gradually decreased towards the upper surface 25. In this case, the opposite sub-sidewalls 124A, 124B may not be parallel to the opposite sidewalls 24. Although both opposite sub-sidewalls 124A, 124B are illustrated as being inclined, embodiments of the present invention are not limited thereto. Alternatively, only one of the opposite sub-sidewalls 124A, 124B may be inclined such that the second chamber 38 is gradually narrowed towards the upper surface 25.

Figure 2B:
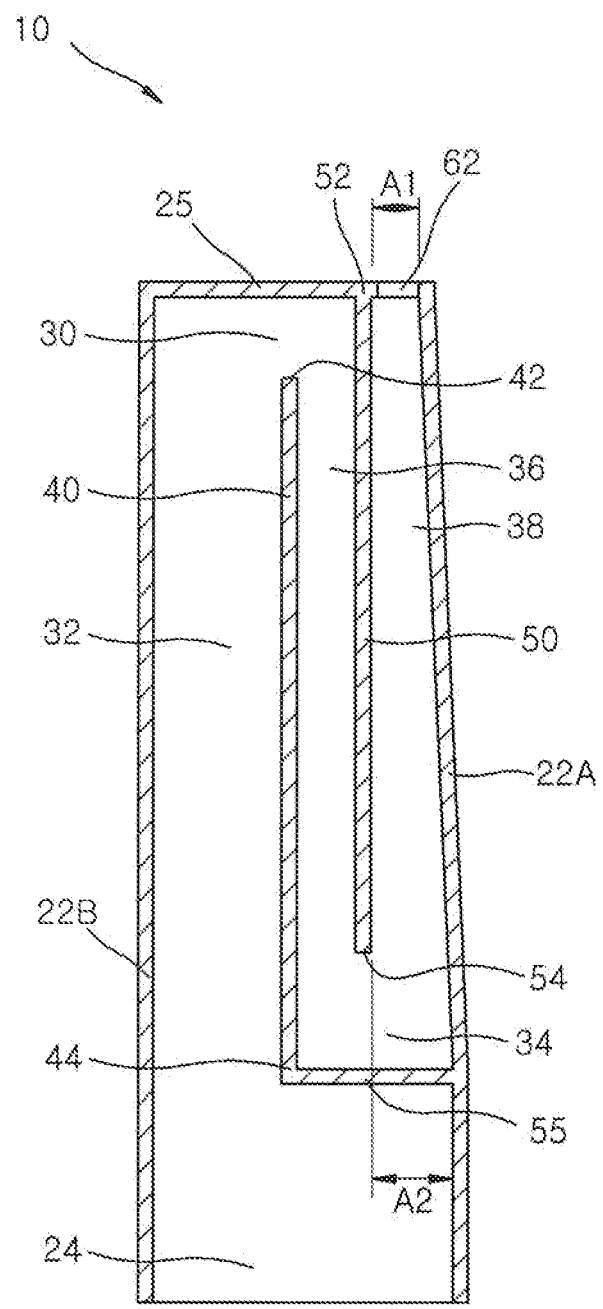
FIG. 2B illustrates a sectional view of the aerator device in accordance with another embodiment of the present invention.

In another embodiment, as shown in FIG. 2B, the second chamber 38 includes the second partition 50 and the first sidewall 22A facing each other; and a pair of opposite sub-sidewalls 124A, 124B (see FIG. 1) connecting the second partition 50 and the first sidewall 22A, wherein, unlike in the embodiment shown in FIG. 1, the opposite sub-sidewalls 124A, 124B are parallel to each other, and the second partition 50 and the first sidewall 22A are inclined such that a distance between the second partition 50 and the first sidewall 22A is gradually decreased towards the upper surface 25. In this case, with the second partition 50 disposed to be parallel to the first partition 40, only the first sidewall 22A may be inclined such that the second chamber 38 is gradually narrowed towards the upper surface 25. Alternatively, the first sidewall 22A may be disposed to be parallel to the first partition 40 and only the second partition 50 may be inclined such that the second chamber 38 is gradually narrowed towards the upper surface 25. Alternatively, both the second partition 50 and the first sidewall 22A are inclined such that the second chamber 38 is gradually narrowed towards the upper surface 25. In this case, the opposite sub-sidewalls 124A, 1248 and the second opposite sidewalls 24 may be parallel to one another.

As used herein, the expression "inclined" means that a corresponding member is disposed not parallel to a plane perpendicular to a bottom surface of the housing.

The second chamber 38 includes the second partition 50 and the first sidewall 22A facing each other; and a pair of opposite sub-sidewalls 124A, 124B connecting the second partition 50 and the first sidewall 22A, wherein an upper area A1 defined by the upper end 52 of the second partition 50, the first sidewall 22A and the pair of opposite sub-sidewalls 124A, 124B is smaller than a lower area A2 defined by the lower end 54 of the second partition, the first sidewall 22A and the pair of opposite sub-sidewalls 124A, 1248. In one or more embodiments, a ratio of the upper area A1 to the lower area A2 is about 1:1.5 to about 1:10, and, in one embodiment, is about 1:2 to about 1:7. Within this range, the aerator device according to an embodiment of the present invention can generate strong pulses, thereby providing excellent cleaning effects.

In one embodiment, the aerator device 10 may further include a third partition 55 connecting the lower end 44 of the first partition 40 to the first sidewall 22A. The third partition 55 is separated from the lower end 54 of the second partition 50 to form a second opening, through which the first chamber 36 and the second chamber 38 are in communication with each other. The first partition 40, the second partition 50, and the third partition 55 may be formed of metal, plastic, glass fiber, and/or other suitable materials.

In one embodiment at least one of the first partition 40, the second partition 50, and the third partition 55 may be substantially straight, such that the aerator device 10 may be easily manufactured.

In another embodiment, at least one of the first partition 40, the second partition 50, and the third partition 55 may have a flat surface, a curved surface, or a polygonal surface.

In one embodiment, the third partition 55 may be formed with a through-hole, through which sludge and the like can be discharged.

In one embodiment, the first partition 40 and the second partition 50 may extend from one of the second opposite sidewalls 24 to the other second opposite sidewall 24. In addition, the first partition 40 and the second partition 50 may extend parallel to the first opposite sidewalls 22A, 22B.

In one embodiment, the housing 20 may include an inlet opening 60 formed in at least one sidewall of the first and second opposite sidewalls 22A, 22B, 24. For example, in one embodiment, the inlet opening 60 may be formed in one of the second sidewalls 24. However, embodiments of the present invention are not limited thereto. In another embodiment, the inlet opening 60 may be formed in at least one of the first opposite sidewalls 22A, 223, or arranged at a lower portion of the housing 20, and may communicate with the first cavity 32. The inlet opening 60 corresponds to an inlet through which air or gas can flow into the first cavity 32.

The housing 20 may further include an outlet opening 62 which, in one embodiment, is formed through the upper surface 25 and in communication with the second chamber 38 for releasing gas bubbles out of the aerator device 10 from the second chamber 38.

In one embodiment, the outlet opening 62 may be a slot extending parallel to the second partition 50 in, a width direction of the second partition 50. Here, the width direction of the second partition 50 refers to a direction parallel to the first opposite sidewalls 22A, 22B.

Figure 2C:
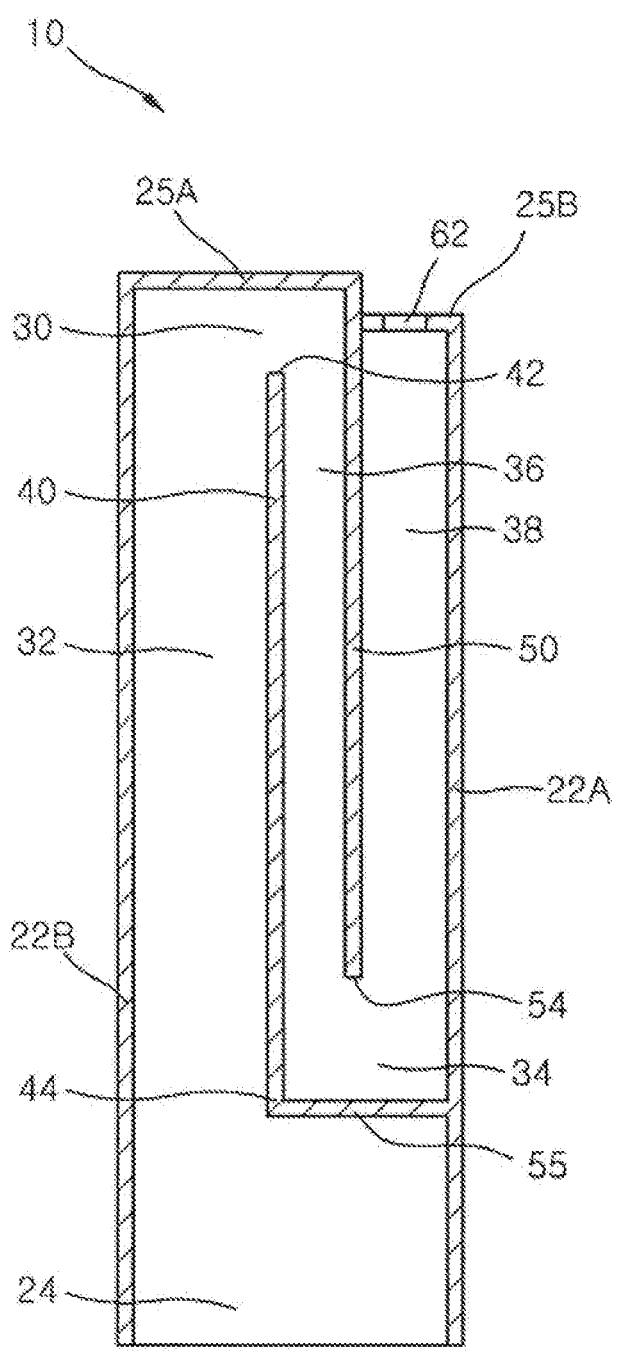
FIG. 2C illustrates a sectional view of the aerator device in accordance with another embodiment of the present invention.
Figure 2D:
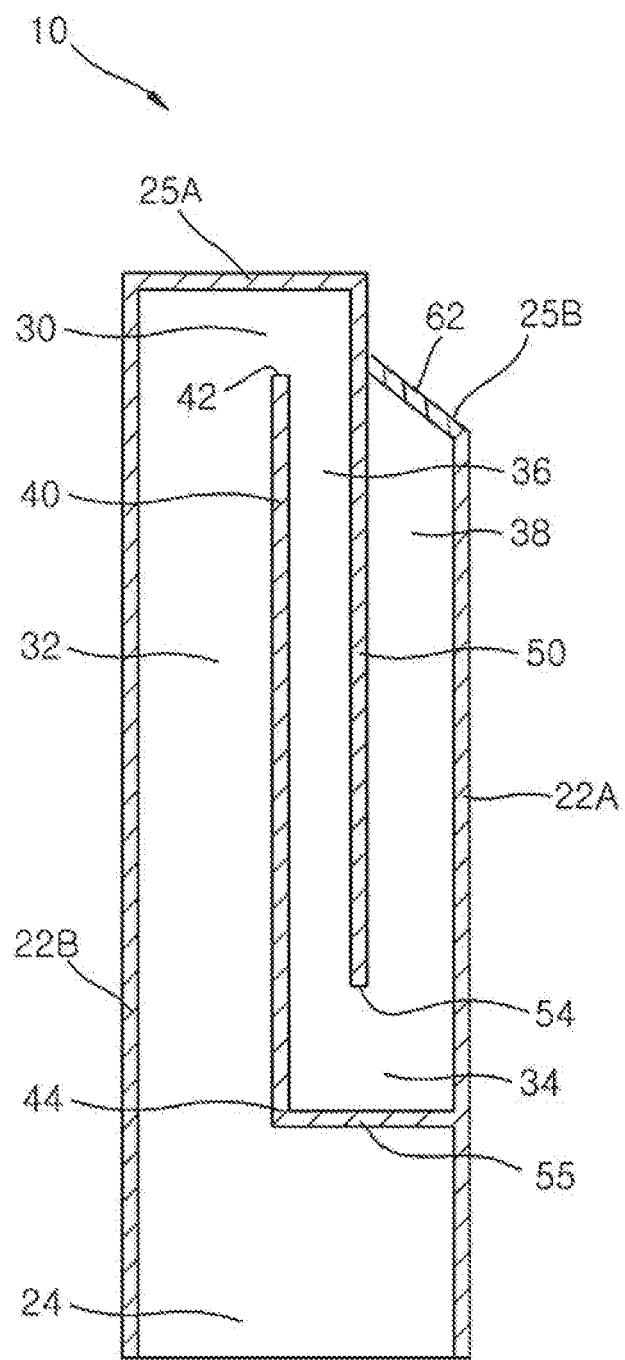
FIG. 2D illustrates a sectional view of the aerator device in accordance with another embodiment of the present invention.

In one or more embodiments, the outlet opening 62 is formed through the upper surface 25 of the second chamber 38, which is defined by the second partition 50 and the first sidewall 22A facing each other, and the pair of opposite sub-sidewalls 124A, 124B, which connect the second partition 50 and the first sidewall 22A. In an embodiment in which the upper surface has the stepped portion, as shown in FIG. 2C, the outlet opening 62 may be formed in a second plane constituting the upper surface 25B of the second chamber 38.

Figure 12:
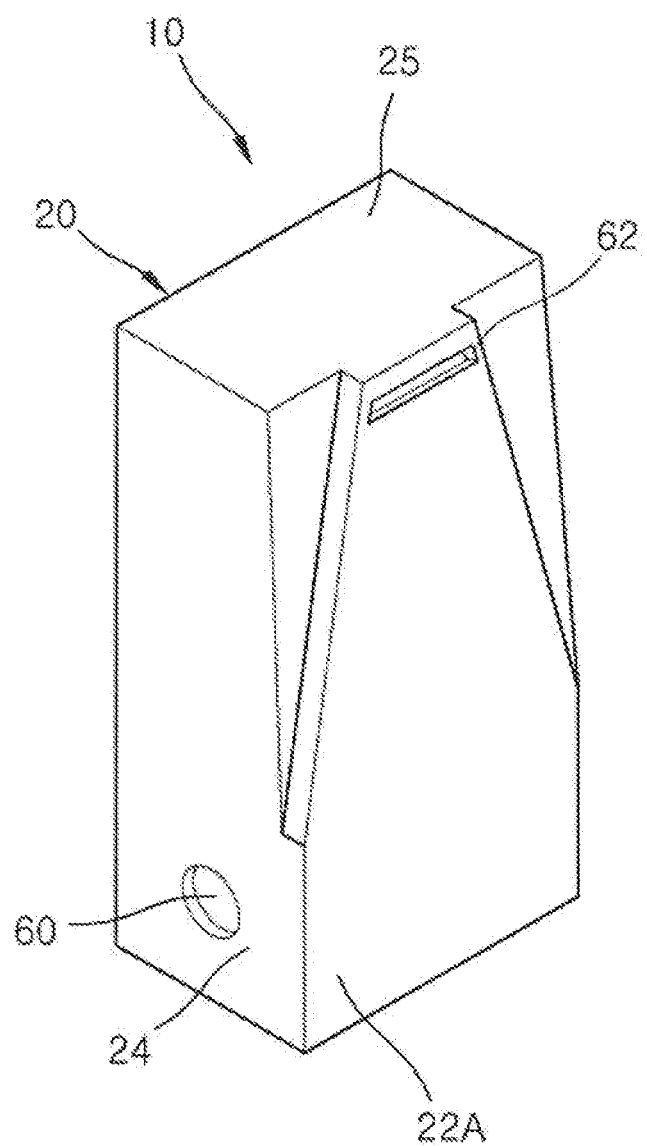
FIG. 12 illustrates a perspective view of an aerator device according to another embodiment of the present invention.

In another embodiment, the outlet opening 62 may be formed at an upper portion of the first sidewall 22. FIG. 12 shows an embodiment in which the outlet opening 62 is formed at an upper portion of the first sidewall 22A instead of the upper surface 25. In one embodiment, the outlet opening 62 may be placed at a location corresponding to about 15% or less of the entire length of the first sidewall 22A from an upper distal end of the first side all 22A. Although the outlet opening 62 is shown as having a slot shape, embodiments of the present invention are not limited thereto.

Figure 13:
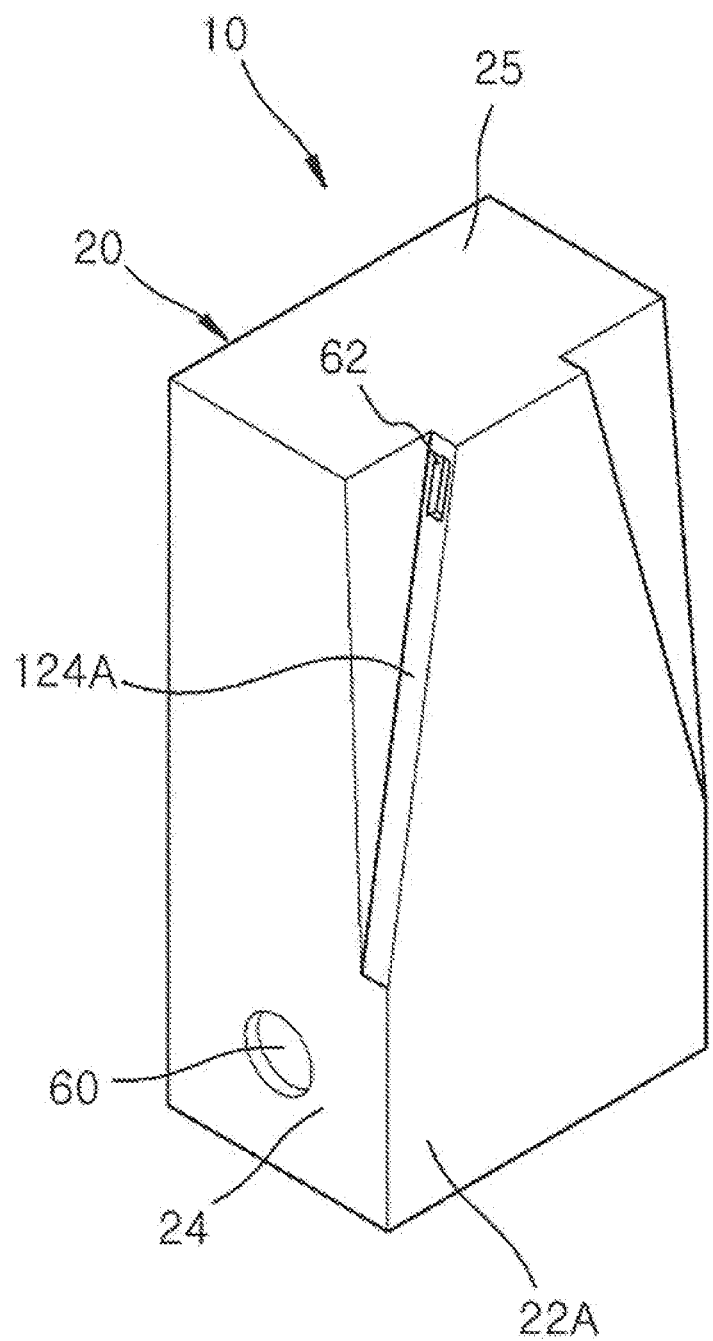
FIG. 13 illustrates a perspective view of an aerator device according to another embodiment of the present invention.

In another embodiment, the outlet opening 62 may be formed in at least one of the opposite sub-sidewalls 124A, 1248 that connect the second partition 50 and the first sidewall 22A, as shown in FIG. 13.

With reference to FIGS. 3A to 3E, stages of intermittent gas bubble generation during operation of the aerator device 10 are shown. The aerator device 10 is submerged in a liquid medium, such as water that is to be filtered.

Figure 3A:
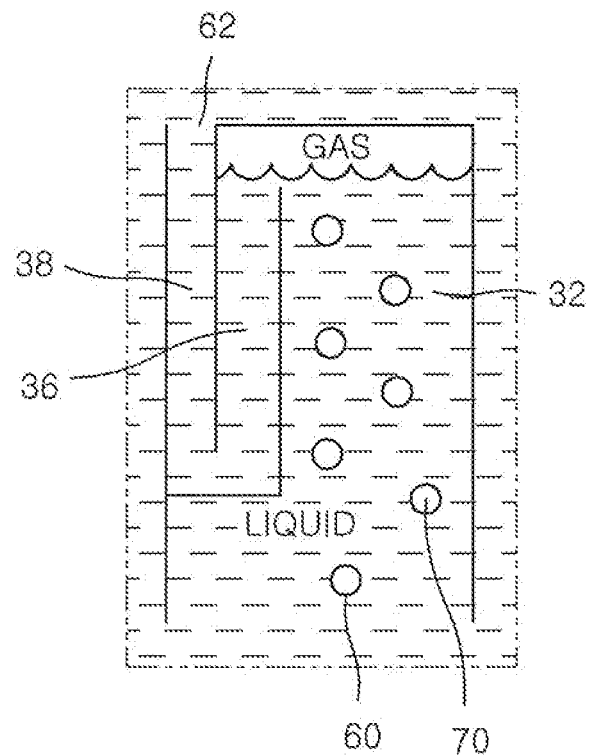
FIG. 3A to FIG. 3E illustrate stages of intermittent gas bubble generation of an aerator device according to the present invention.
Figure 3B:
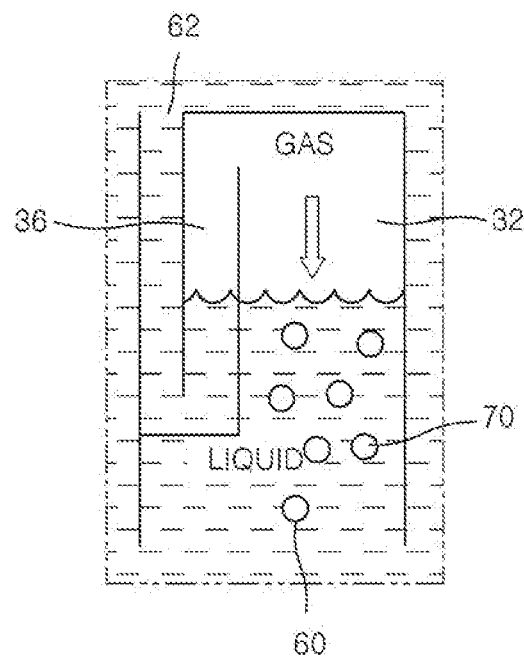

Referring to FIG. 3A, a gas 70 is supplied into the inner cavity 30 of the aerator device 10 through the inlet opening 60. The inlet opening 60 may be directly connected to the housing 20, such as passing through at least one of the opposite sidewalls 22A, 22B of the housing 20. However, embodiments of the present invention are not limited thereto. In one embodiment, the gas may be air, without being limited thereto. In another embodiment, the gas may be any other suitable gas. In one embodiment, the gas 70 may be supplied continuously at a substantially constant rate.

Referring to FIG. 38, as the amount of gas 70 in the inner cavity 30 increases the gas 70 rises to the top of the first cavity 32 and the first chamber 36 of the second cavity 34, thereby causing a liquid level in the first cavity 32 and the first chamber 36 to be lowered. That is, the first cavity 32 is a gas storage section and the first chamber 36 is a gas retention section.

Figure 3C:
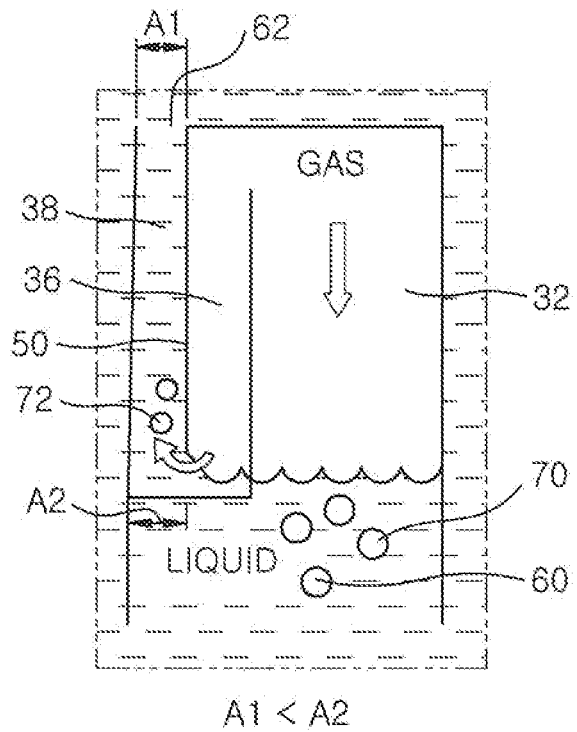

Further, referring to FIG. 3C, when the liquid level of the first chamber 36 becomes lower than the lower end 54 of the second partition 50, the gas 70 moves from the first chamber 36 to the second chamber 38 through the opening below the lower end 54 of the second partition 50. The gas 70 then rises through the second chamber 38 and is released as gas bubbles 72 through the outlet opening 62. Here, since the second chamber 38 has an upper end narrower than the lower end thereof, that is, since the upper area A1 of the second chamber 38 is smaller than the lower area A2 of the second chamber 38, the bubbles can generate strong pulses, and most of the gas 70 in the first chamber 36 and the first cavity 32 is released through the outlet opening 62 in a short amount of time. That is, the second chamber 38 is a gas bubble flow section. Here, the upper area A1 is defined by the upper end 52 of the second partition 50, the first sidewall 22A and the pair of opposite sub-sidewalls 124A, 124B, and the lower area A2 is defined by the lower end 54 of the second partition 50, the first sidewall 22A and the pair of opposite sub-sidewalls 124A, 1248.

Figure 3D:
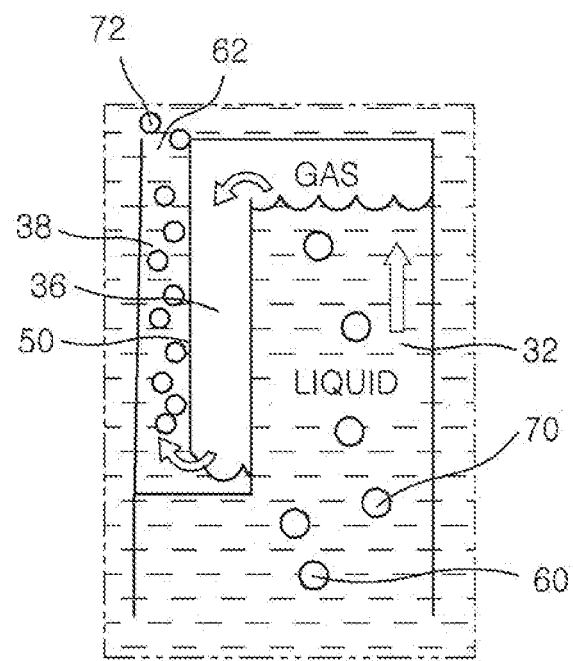

Referring to FIG. 3D, the gas 70 continues to flow out through the second chamber 38 via a siphon effect, and the liquid level of the first cavity 32 rises.

Figure 3E:
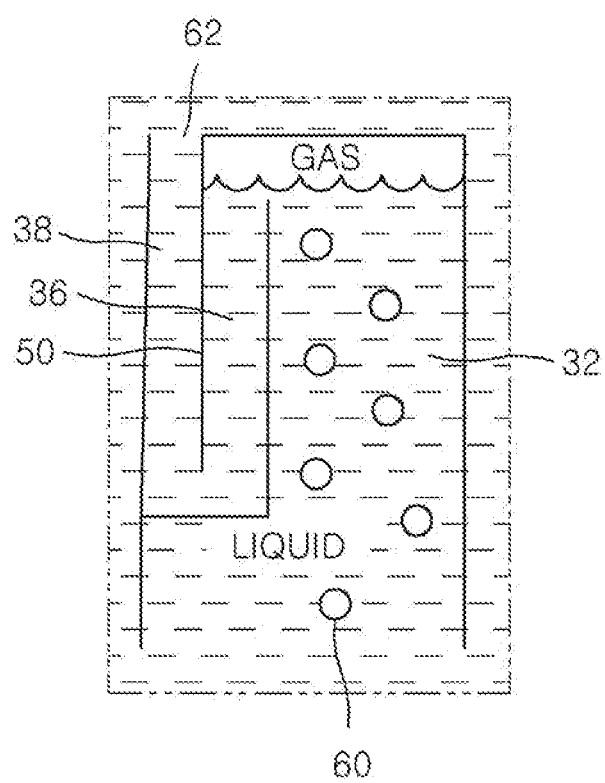

Finally, referring to FIG. 3E, the liquid level rises in the first cavity 32 until it reaches the upper end 42 of the first partition 40 acting as a weir, and then the liquid flows over the upper end 42 of the first partition 40 and into the first chamber 36. As described with reference to FIG. 3A, the gas 70 being supplied into the inner cavity 30 through the inlet opening 60 again rises to the top of the first cavity 32 and the first chamber 36, and again causes the liquid level in the first cavity 32 and the first chamber 36 to be lowered. These stages of gas bubble generation of the aerator device 10 are repeated, thereby producing intermittent short periods of gas bubble generation.

Figure 4:
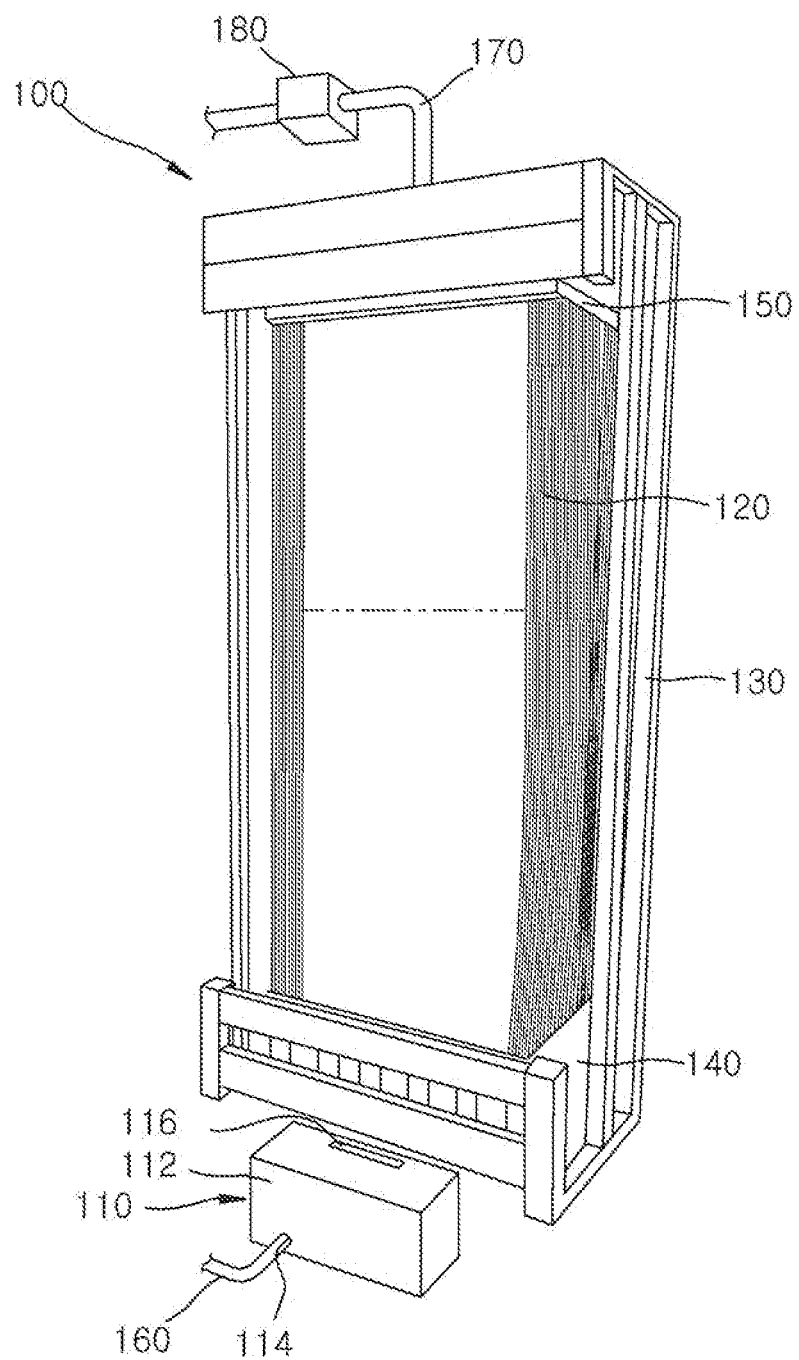
FIG. 4 illustrates a perspective view of a filter system including an aerator device, according to an embodiment of the present invention.
Figure 5:
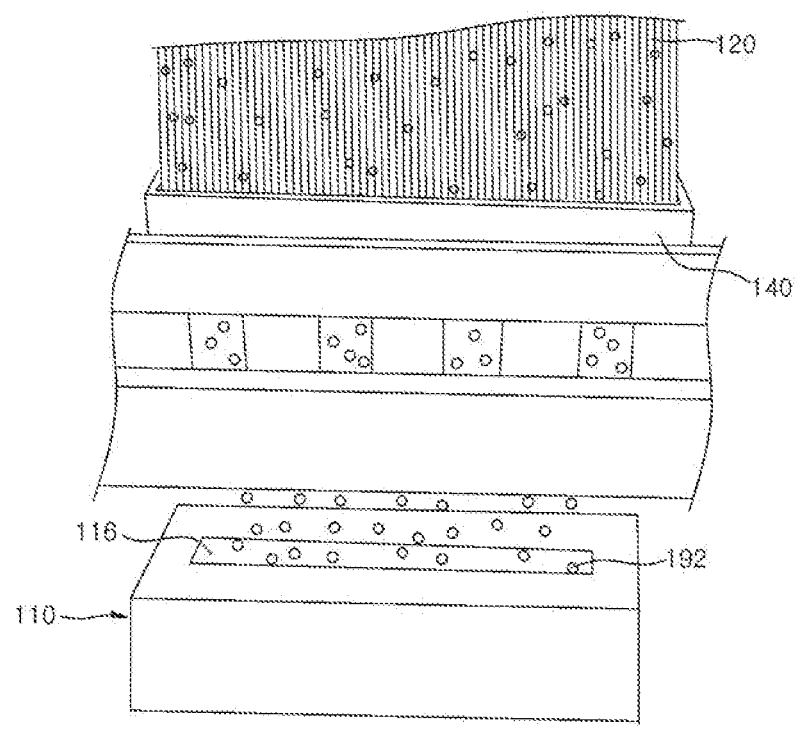
FIG. 5 illustrates a lower portion of the filter system including an aerator device shown in FIG. 4.

Referring to FIGS. 4 and 5, a filter system 100 according to one embodiment includes an aerator device 110 having the same or substantially the same structure as that of the aerator device 10 described above, and has a function of intermittently generating gas bubbles. However, embodiments of the present invention are not limited thereto, and, in other embodiments, the filter system 100 may include an aerator device according to another embodiment of the present invention.

In one embodiment, the filter system 100 includes the aerator device 110 and a filter 120. In one embodiment, the aerator device 110 is mounted below the filter 120 such that gas bubbles 192 released from the aerator device 110 may rise around and between members of the filter 120 in order to clean surfaces of the filter 120. In one embodiment, the aerator device 110 may be separated from the filter 120, such that the aerator device 110 may be located near the filter 120 and provides efficient cleaning of the filter 120. In one embodiment, the aerator device 110 may be arranged in a gap, between sub-modules or members of the filter 120. The aerator device 110 includes a housing 112, an inlet opening 114 through which gas is supplied to an inner cavity of the housing 112, and an outlet opening 116 through which the gas bubbles 192 are released to the filter 120 in an upward direction. In one embodiment, the filter 120 may include a membrane filter including one or more fiber bundles, such as hollow fibers, flat sheets, and/or other types of membranes. In another embodiment, the filter 120 may include other types of filters such as sand filters, which are different from the membrane filters. However, embodiments of the present invention are not limited thereto. In another embodiment, the filter 120 may include any other suitable filter device to be aerated by the aerator device 110. The filter system 100 may be submerged in a liquid medium to be filtered. The liquid medium may include any liquid medium to be filtered, such as water, mixed liquor, etc.

In one embodiment, the fitter system 100 further includes a frame 130, a lower header 140, and an upper header 150 supporting the filter 120. In addition, the filter system 100 includes a gas supply 160 connected to the inlet opening 114 of the aerator device 110 to supply the gas into the inner cavity of the aerator device 110. The inlet opening 114 may be connected to the housing 112 through a sidewall of the housing 112, or may be directly connected to other portions of the housing 112, such as a bottom of the housing, for example. In one embodiment, the filter system 100 may include a liquid outlet 170 to remove filtered liquid from the filter 120. The liquid outlet 170 may be connected to a pump 180 or other suitable device for flowing the filtered liquid from the filter 120.

The aerator device 110 may be composed of a single aerator unit or a plurality of aerator units. For example, the aerator device 110 may be composed of a plurality of aerator units arranged in series or in, parallel. Here, the aerator unit refers to the aerator device 10 which includes a single outlet opening.

In some embodiments, the filter 120 may include a plurality of filter module and the aerator device 110 may be composed of the plurality of aerator units. In one embodiment, a respective aerator unit of the plurality of aerator units is arranged below each filter module of the plurality of filter modules.

Figure 6:
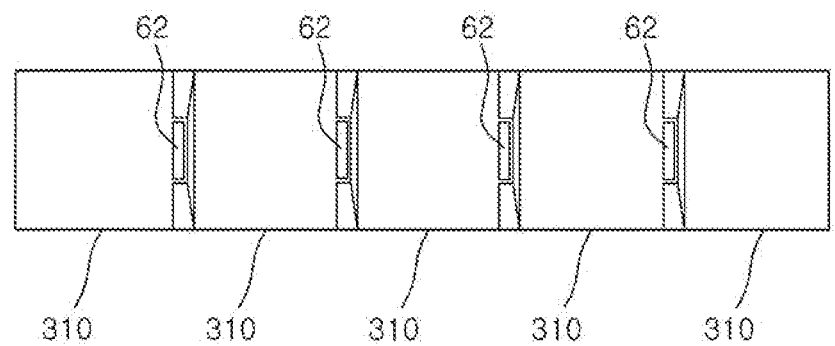
FIG. 6 illustrates a schematic top view of an aerator device according another embodiment of the present invention.

In one embodiment, as shown in FIG. 6, each of plurality of aerator units 310 includes a single outlet opening 62, and the aerator units 310 may be arranged in a first direction. In this case, the first sidewall 22A of a respective one of the aerator units 310 may face the first sidewall 22B of an adjacent one of the aerator units 310.

Figure 7:
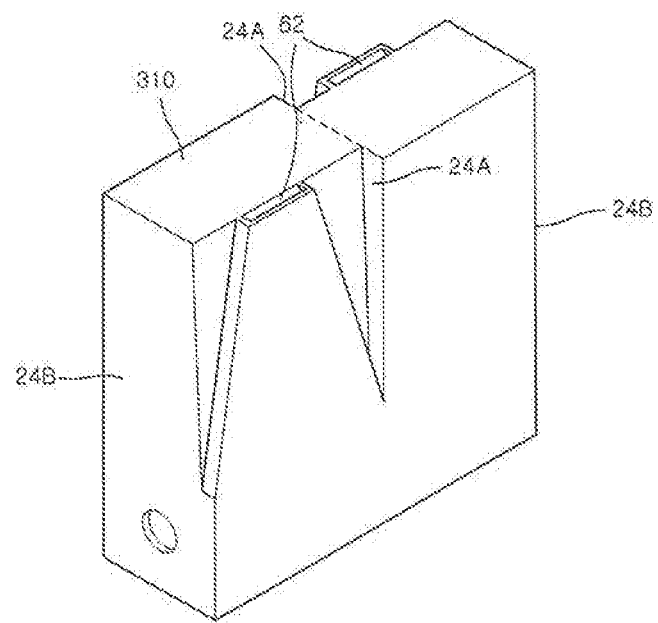
FIG. 7 illustrates a perspective view of an aerator device according to another embodiment of the present invention.
Figure 8:
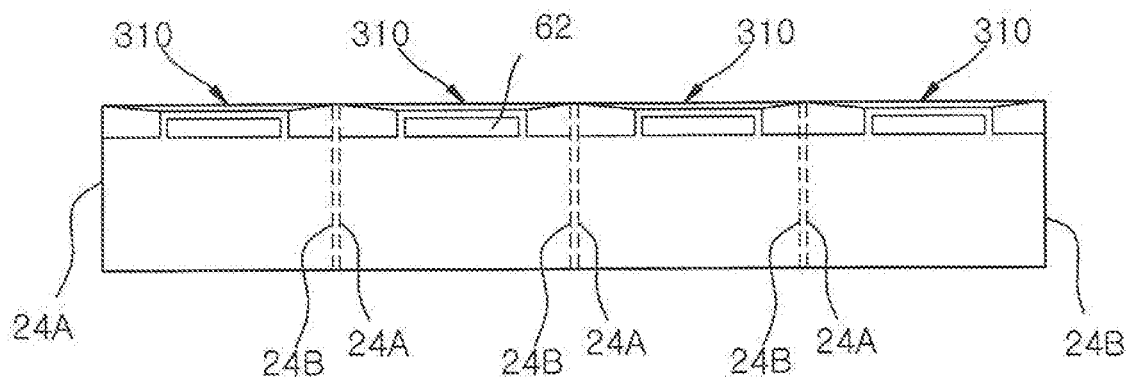
FIG. 8 illustrates a schematic top view of an aerator device according to another embodiment of the present invention.

In other embodiments, as shown in FIG. 7 and FIG. 8, the aerator units 310 may be arranged such that the second sidewall 24 of a respective one of the aerator units 310 may face the second sidewall 24 of another one of the aerator units 310 adjacent thereto. In this case the outlet openings 62 of the aerator units 310 may be arranged in a line in the same direction, or may be alternately arranged in opposite directions. FIG. 7 shows an offset arrangement of aerator units 310 in which a second sidewall 24A of a respective aerator unit faces a second sidewall 24A of another aerator unit adjacent thereto, and FIG. 8 shows a linear arrangement of aerator units 310 in which a second sidewall 24A of a respective aerator unit 310 faces a second sidewall 24B of another aerator unit 310 adjacent thereto.

Figure 9:
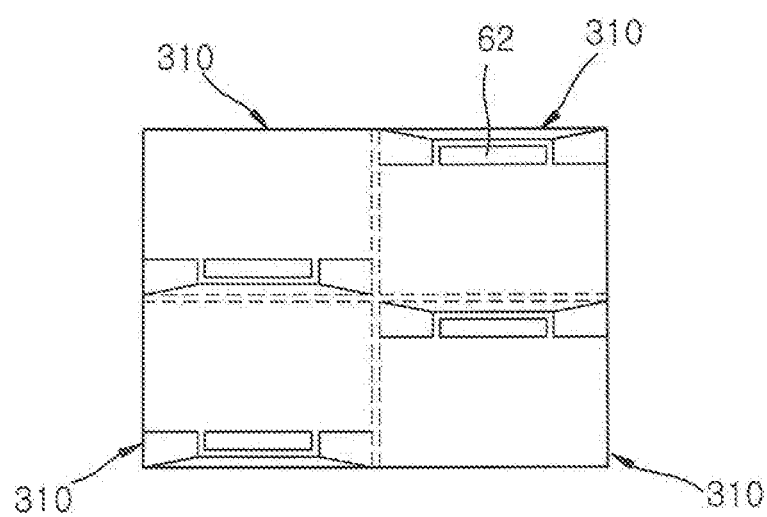
FIG. 9 illustrates a schematic top view of an aerator device according to another embodiment of the present invention.

In another embodiment, as shown in FIG. 9, the plural aerator units 310 may be arranged in plural rows in an offset arrangement.

Figure 10:
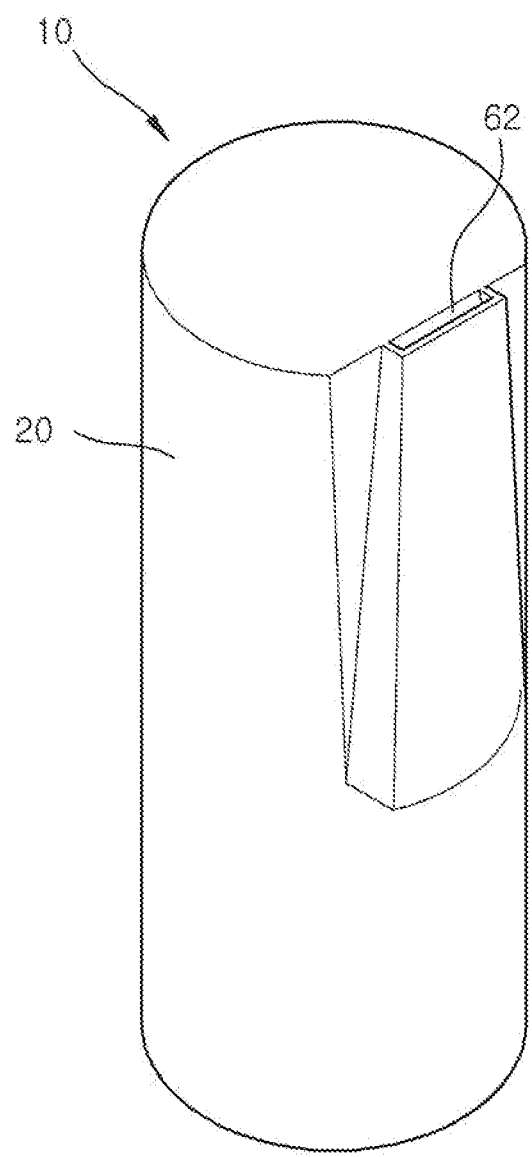
FIG. 10 illustrates a perspective view of an aerator device according to another embodiment of the present invention.

Although the aerator devices according to the present invention have been illustrated as having a rectangular or box-shaped housing in some embodiments of the present invention, it should be understood that the present invention is not limited thereto. For example, referring to FIG. 10, in the aerator device 10 according to another embodiment, the housing 20 may be cylindrical. In other embodiments, the aerator devices may include housings having other suitable shapes, such as a prism shape a pyramidal shape, a dome shape, a truncated prism shape, a truncated conical shape, and the like. In this case, the partition may have a flat surface, a polygonal surface, or a curved surface.

Hereinafter, the present invention will be described in more detail with reference to some examples. However, it should be noted that these examples are provided for illustration only and are not to be construed in any way as limiting the present, invention. Descriptions of details apparent to those skilled in the art will be omitted for clarity.

EXAMPLE

Example 1

A mixed liquid having a concentration of 8000 mg/L to 10,000 was prepared in an aerobic tank. The mixed liquid was pumped into a membrane tank, where three membrane modules were installed. Each membrane module had a surface area of about 24 m², and a total membrane area tested was 72 m². Each of the membrane modules was provided at a lower portion thereof with an aerator as shown in FIG. 1. According to the operation protocol, the operating flux was first set, and each filtration cycle was kept at 15 minutes involving 14.5 minutes of filtration and 0.5 minutes of backwash plus air scouring. Two cycles were carried out for each flux rate. The flux speed was changed at a subsequent stage. Operation of the filter system was stopped when a substantial permeability decrease or transmembrane pressure (TMP) rise was noticed during one cycle of filtration. Air was injected at a flux of 0.13 m³/m²/hr and an air consumption amount and TMP increase rate were measured in operation for 3 days. Results are shown in Table 1 and FIG. 11.

Comparative Example 1

An air consumption amount and TMP increase rate were measured using an aerator device according to Comparative Example 1 having a same structure and size as those of the aerator device of Example 1 except that the aerator device of Comparative Example 1 did not include the second chamber gradually narrowing in an upward direction.

TABLE 1

|  | Presence of second chamber gradually narrowing in upward direction | Flux at 20° C. (LMH) | TMP increase rate (kPa/day) |
|---|---|---|---|
| Example 1 | ○ | 20 | 0 |
|  |  | 30 | 0 |
|  |  | 50 | 0.7 |
|  |  | 55 | 0.9 |
|  |  | 60 | 1.6 |
| Comparative Example 1 | X | 20 | 0 |
|  |  | 30 | 0.1 |
|  |  | 50 | 1.0 |
|  |  | 55 | 1.5 |
|  |  | 60 | 2.4 |

* Flux at 20° C. = actual Flux × (η1/η0)
η1: viscosity of water at measurement temperature
η0: viscosity of water at 20° C.

Figure 11:
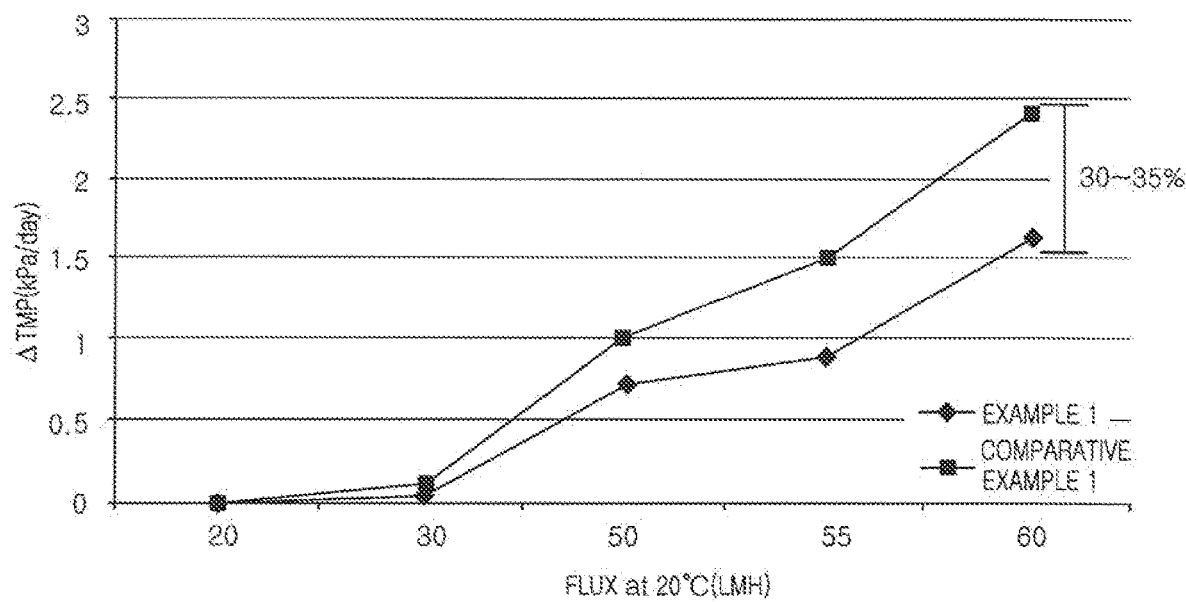
FIG. 11 illustrates a graph showing an increase rate of transmembrane pressure (IMP) according to flux in an Example 1 according to an embodiment of the present invention and a Comparative Example 1.

As shown in Table 1 and FIG. 11, it is confirmed that the aerator device of Example 1 decreased the TMP increase rate by 35% as compared to that of the aerator device of Comparative Example 1 under conditions of the same air flux.

Although the present invention has been described with reference to some exemplary embodiments, it should be understood that the described embodiments are provided for purposes of illustration only and are not to be construed in any way as limiting the present invention, and that various modifications, changes, alterations, and equivalent embodiments can be made by those skilled in the art without departing from the spirit and scope of the present invention.

What is claimed is:

1. An aerator device comprising:
a housing having an inner cavity defined therein, the housing including at least one sidewall and an upper surface connected to the at least one sidewall;
a first partition formed within the inner cavity and extending in a downward direction from an upper end to a lower end to define a first cavity and a second cavity; and
a second partition formed within the inner cavity between the first partition and a first sidewall of the at least one sidewall and extending in the downward direction from an upper end to a lower end to define a first chamber and a second chamber of the second cavity,
wherein the housing comprises an inlet opening communicating with the first cavity and an outlet opening communicating with the second chamber,
the first partition is spaced apart at the upper end thereof from the upper surface of the housing to form a first opening, through which the first cavity and the second cavity are in communication with each other,
the upper end of the second partition is connected to the upper surface of the housing, the first chamber and the second chamber being in communication with each other below the lower end of the second partition,
the inlet opening is an inlet through which a gas is flowable into the first cavity, and the housing is sealed at a top side of the inner cavity in the first cavity and the first chamber such that the gas passes from the first cavity through the first opening and below the lower end of the second partition to the second chamber to release gas bubbles only through the outlet opening when the gas is flowed into the first cavity,
the outlet opening passes through the upper surface of the housing in an upward direction opposite the downward direction, such that the gas bubbles are released only through the outlet opening in the upward direction,
wherein the outlet opening is a slot extending parallel to the first partition and the second partition, and
the second chamber is defined by the second partition and the first sidewall facing each other, and a pair of opposite sub-sidewalls connecting the second partition and the first sidewall, and
the second partition and the pair of opposite sub-sidewalls have a flat surface,
wherein the second partition is parallel to the first sidewall, and at least one of the pair of opposite sub-sidewalls is inclined such that a distance between the pair of opposite sub-sidewalls decreases towards the upper surface of the housing such that the second chamber narrows along the upward direction towards the upper surface of the housing, or
wherein the second partition and the first sidewall are inclined relative to each other such that a distance between the second partition and the first sidewall decreases towards the upper surface of the housing such that the second chamber narrows along the upward direction towards the upper surface of the housing,
the outlet opening is on the upper surface of the housing, and is positioned at an upper area and vertically above a lower area,
the upper area is defined by the upper end of the second partition, the first sidewall and a pair of second opposite sub-sidewalls,
the lower area is defined by the lower end of the second partition, the first sidewall, and the pair of opposite sub-sidewalls, the upper area of the second chamber is smaller than the lower area of the second chamber, a ratio of the upper area to the lower area is about 1:2 to about 1:10, so that the gas bubbles released through the outlet opening can generate pulses, wherein the upper surface has a flat shape and constitutes a cover or a ceiling of the housing.

2. The aerator device according to claim 1, wherein the first and second partitions comprise a flat surface, a curved surface, or a polygonal surface.

3. The aerator device according to claim 1, wherein the at least one sidewall comprises a pair of first opposite sidewalls and a pair of second opposite sidewalls connected to the first opposite sidewalls, the pair of first opposite sidewalls comprising the first sidewall, the first and the second partitions extending from one of the second opposite sidewalls to the other of the second opposite sidewalls.

4. The aerator device according to claim 1, further comprising a third partition connecting the lower end of the first partition to the first sidewall, the third partition being spaced apart from the lower end of the second partition to form a second opening through which the first chamber and the second chamber are in communication with each other.

5. The aerator device according to claim 1, wherein the aerator device is configured to intermittently release the gas bubbles through the outlet opening when the aerator device is submerged in a liquid medium and the gas is supplied to the first cavity through the inlet opening.

6. A filter system comprising:
a filter;
an aerator device arranged below the filter, the aerator device comprising:
   a housing having an inner cavity defined therein, the housing including at least one sidewall and an upper surface connected to the at least one sidewall;
   a first partition formed within the inner cavity and extending in a downward direction from an upper end to a lower end to define a first cavity and a second cavity; and
   a second partition formed within the inner cavity between the first partition and a first sidewall of the at least one sidewall and extending in the downward direction from an upper end to a lower end to define a first chamber and a second chamber of the second cavity,
wherein the housing comprises an inlet opening communicating with the first cavity and an outlet opening communicating with the second chamber,
the first partition is spaced apart at the upper end thereof from the upper surface of the housing to form a first opening, through which the first cavity and the second cavity are in communication with each other,
the upper end of the second partition is connected to the upper surface of the housing, the first chamber and the second chamber being in communication with each other below the lower end of the second partition; and
a gas supply connected to the inlet opening and configured to supply a gas to the first cavity such that the gas passes from the first cavity through the first opening and below the lower end of the second partition to the second chamber to release gas bubbles only through the outlet opening, wherein the outlet opening passes through the upper surface of the housing in the upward direction, such that the gas bubbles are released only through the outlet opening in the upward direction, and the outlet opening is a slot extending parallel to the first partition and the second partition, and the filter and the aerator device are configured to be submerged in a liquid medium, the second chamber is defined by the second partition and the first sidewall facing each other, and a pair of opposite sub-sidewalls connecting the second partition and the first sidewall, and the second partition and the pair of opposite sub-sidewalls have a flat surface, wherein the second partition is parallel to the first sidewall, and at least one of the pair of opposite sub-sidewalls is inclined such that a distance between the pair of opposite sub-sidewalls decreases towards the upper surface of the housing such that the second chamber narrows along the upward direction towards the upper surface of the housing, or wherein the second partition and the first sidewall are inclined relative to each other such that a distance between the second partition and the first sidewall decreases towards the upper surface of the housing such that the second chamber narrows along the upward direction towards the upper surface of the housing, the outlet opening is on the upper surface of the housing, and is positioned at an upper area and vertically above a lower area, the upper area is defined by the upper end of the second partition, the first sidewall and a pair of second opposite sub-sidewalls, the lower area is defined by the lower end of the second partition, the first sidewall, and the pair of opposite sub-sidewalls, the upper area of the second chamber is smaller than the lower area of the second chamber, a ratio of the upper area to the lower area is about 1:2 to about 1:10, so that the gas bubbles released through the outlet opening can generate pulses, wherein the upper surface has a flat shape and constitutes a cover or a ceiling of the housing.

7. The filter system according to claim 6, wherein the filter comprises a fiber membrane filter, and the filter system further comprises a pump to flow the liquid medium through the fiber membrane filter.

8. The filter system according to claim 6, wherein the filter comprises a plurality of filter modules, and the aerator device comprises a plurality of aerator units, a respective aerator unit of the plurality of aerator units being arranged below each filter module of the plurality of filter modules.

* * * * *